United States Patent
Bryant

[15] 3,688,478
[45] Sept. 5, 1972

[54] AQUATIC HARVESTING APPARATUS WITH AIR BORNE DISCHARGE

[72] Inventor: Charles Brate Bryant, Rte. #1, Box 150, Wildwood Point Road, Hartland, Wis. 53029

[22] Filed: March 3, 1971

[21] Appl. No.: 120,401

[52] U.S. Cl. ..................................56/1, 198/128
[51] Int. Cl. ..................................A01d 45/08
[58] Field of Search.........56/1, 8, 9, 473.5, 474, 475; 37/58, 59; 198/128; 214/500, 501, 519–522, 82, 767, 151; 198/128

[56] References Cited

UNITED STATES PATENTS

| | | |
|---|---|---|
| 1,344,626 | 6/1920 | Ellis..................................56/9 |
| 1,481,177 | 1/1924 | Bayard et al.....................56/9 |
| 2,693,161 | 11/1954 | Stubbs..........................56/8 X |
| 2,779,455 | 1/1957 | Sinclair......................198/128 |
| 2,788,115 | 4/1957 | Friedman..................198/128 |
| 3,114,450 | 12/1963 | Beiler.......................198/128 |
| 3,238,708 | 3/1966 | Zickefoose....................56/9 |
| 3,546,858 | 12/1970 | Chaplin..........................56/9 |
| 2,651,404 | 9/1953 | James........................198/128 |
| 3,286,447 | 11/1966 | Grinwald........................56/9 |

FOREIGN PATENTS OR APPLICATIONS 15,257  8/1904  Great Britain..................56/8

Primary Examiner—Russell R. Kinsey
Attorney—Wheeler, House & Wheeler

[57] ABSTRACT

Aquatic harvesting apparatus particularly adapted for harvesting floating vegetation or oil absorbent material spread on an oil slick includes a harvesting barge with a forwardly located inclined pickup conveyor having a lower end extending into the water and a discharge end located over a consolidation chute on the barge. The chute has converging side walls to compact the vegetation, and a live bed which accelerates the weeds as they are conveyed to a thrower which projects the weeds above the surface of the water to a shore disposal site or a transport barge. When the harvesting barge is moored in a channel to intercept weeds carried by a current, the harvesting barge can be used with a boom which has an end pivoted adjacent the harvesting barge to vary the intake volume of weeds delivered to the harvesting barge. The boom can be provided with a driven endless chain having flights to maintain continuous weed flow along the boom and prevent bunching of the weeds.

4 Claims, 5 Drawing Figures

PATENTED SEP 5 1972
3,688,478
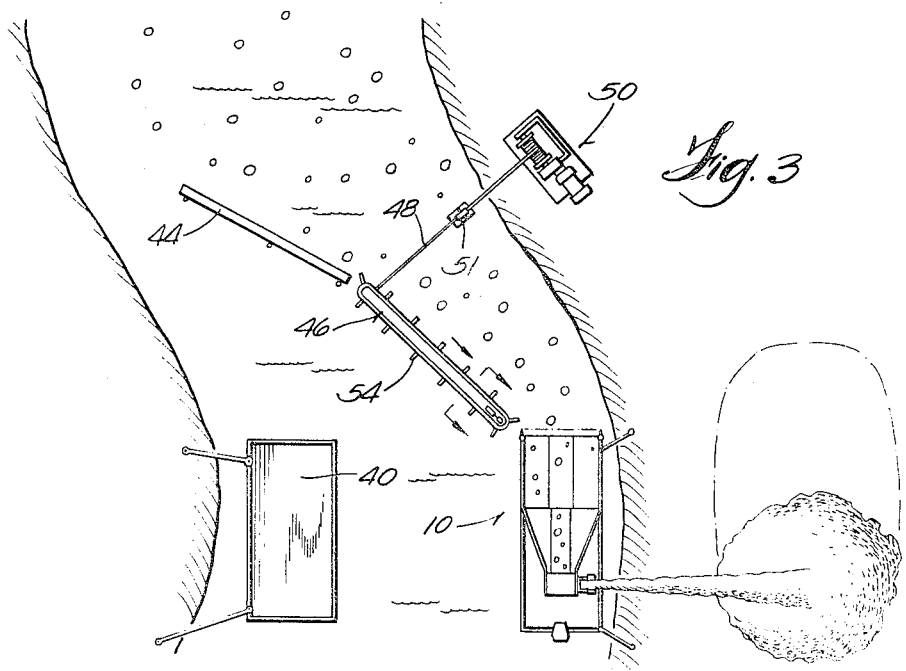
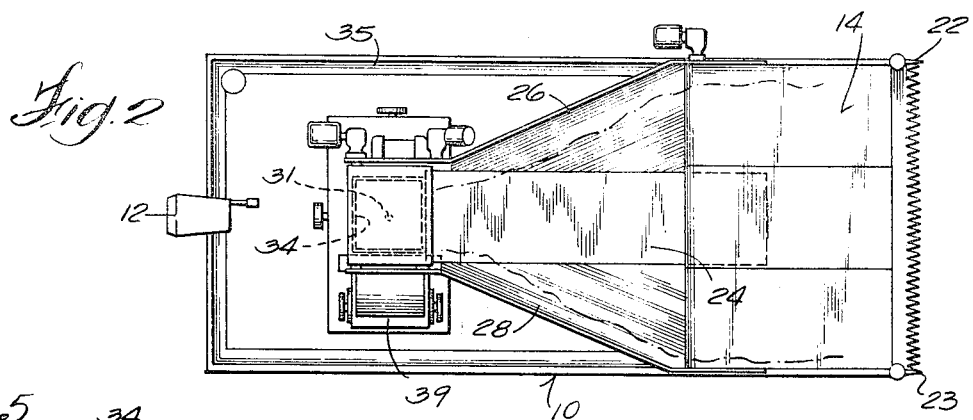
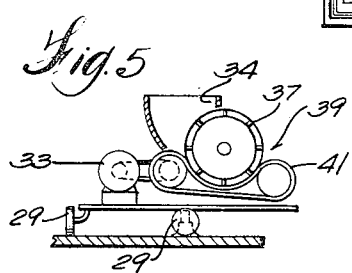
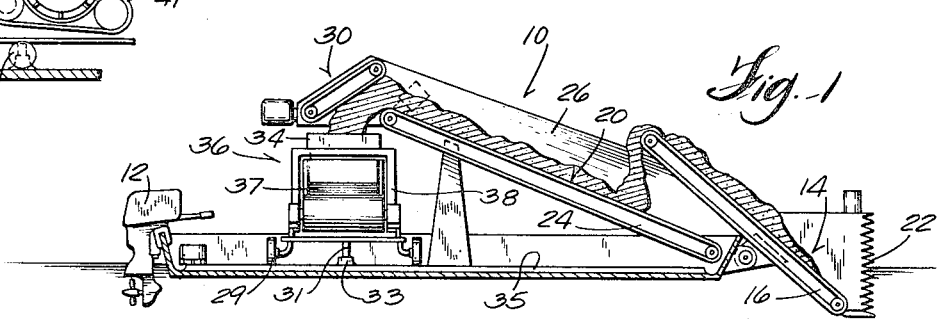
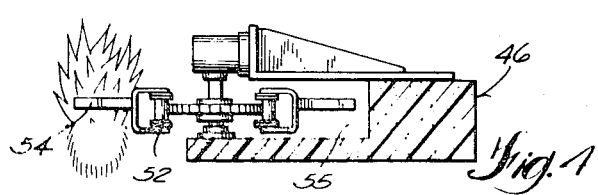
Inventor
Charles Brate Bryant
By Wheler, House & Wheler
Attorneys

AQUATIC HARVESTING APPARATUS WITH AIR BORNE DISCHARGE

BACKGROUND OF INVENTION

The art has failed to provide economical and efficient method and apparatus for harvesting floating aquatic vegetation such as hyacinth.

SUMMARY OF INVENTION

The invention provides method and apparatus for harvesting floating debris such as oil soaked straw or floating or submerged aquatic vegetation. The apparatus includes a self-propelled compact harvesting barge which has an inclined pickup conveyor with a lower end extending into the water and the other end located above a consolidation chute on the harvesting barge. The consolidation chute has a live bed and rearwardly converging side walls which compact and consolidate the vegetation as it is moved progressively rearwardly for discharge into the hopper of a pivotally mounted centrifugal thrower. A compression conveyor located above the hopper compacts the vegetation in a vertical dimension prior to deposition of the vegetation into the hopper.

The trajectory and the horizontal discharge angle of the centrifugal thrower are adjustable to permit discharge of the vegetation onto convenient shore disposal sites at different heights or distances, or onto a transport barge anchored near the harvesting barge.

The harvesting barge can be utilized in either a mobile mode or a stationary mode. With the mobile mode the harvesting barge is moved under its own power into the vegetation or debris, and in the stationary mode, the barge is anchored in the path of debris of vegetation carried by a current, such as a stream or channel. With the latter use, the apparatus includes a boom which can be employed to funnel the floating weeds into the pickup conveyor of the harvesting barge when the barge is moored in a flowing stream. The end of the boom adjacent the harvesting barge is pivotally anchored to the bed of the channel and the other end is connected to the winch cable of a winch located on the shore. The winch is used to adjust the angle of the boom relative to the pickup conveyor on the harvesting barge to vary the volume of weeds delivered to the harvesting barge. To prevent bunching of the weeds, the boom carries an endless chain with projecting flights which move along the surface of the water to keep the weeds flowing towards the pickup conveyor of the harvesting barge.

The high harvesting capacity of the apparatus of the invention, the maneuverability and small size of the harvesting barge enable efficient weed removal in large or small waterways at a minimum expense per ton of harvested vegetation.

The centrifugal thrower also enables convenient handling of oil absorbing material such as straw which is an inexpensive and effective oil absorbent.

Further objects and advantages of the present invention will become apparent from the following disclosure.

DRAWINGS

FIG. 1 is a side elevational view of harvesting apparatus in accordance with the invention.

FIG. 2 is a plan view of the harvesting barge shown in FIG. 1.

FIG. 3 is a greatly reduced view of the harvesting barge shown in FIG. 2 in operation in a channel with an adjustable boom.

FIG. 4 is an enlarged sectional view along line 4 — 4 of FIG. 3.

FIG. 5 is an enlarged fragmentary diagrammatic side view of the centrifugal thrower shown in FIG. 1.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows an aquatic harvesting barge in accordance with the invention which is generally designated 10 and which includes an engine 12. Means are provided for gathering and removing the aquatic vegetation from the water. As disclosed, the means comprises a foraminous pickup conveyor 14 pivotally mounted on the forward end of the barge 10. The lower end 16 of the conveyor 14 is beneath the surface of the water, when in use, to pick-up aquatic vegetation or debris. When the barge is employed to harvest weeds growing beneath the surface, the conveyor 14 can include conventional vertical side cutters 22 and a horizontal cutter 23.

The conveyor 14 deposits the vegetation in a chute 20 which has a forwardly and downwardly inclined conveyor or high speed live bed 24. The barge 10 can be provided with rearwardly inclined drain troughs 35 (FIG. 2) to remove the water to an automatic sump pump (not shown). The chute 20 has downwardly converging side walls 26 and 28 which compress and compact the vegetation against the live bed 24. The conveyor 24 advances the vegetation to a compression conveyor 30 which further compresses the vegetation as the weeds are deposited in the hopper 34 of a centrifugal thrower 36.

The centrifugal thrower 36 has a motor driven drum or paddle wheel 37 located within a housing 38 which has an outlet or discharge slot 39 for discharging debris or weeds. The floor of the housing comprises the upper run of an endless belt 41 driven by a motor 33. The hopper 34 feeds the weeds between the belt 41 and the paddle wheel 37 which is frictionally engaged and thus driven by the moving belt, and which discharges the weeds through the outlet 39.

To facilitate deposition of weeds at a convenient shore disposal site, the centrifugal thrower 36 is mounted to pivot about a vertical axis to vary the horizontal discharge angle. In this regard a vertical pin 31 on the thrower 36 is received in a vertical socket 33 on the barge 10. The thrower 36 is supported by wheels 29. The centrifugal thrower 36 also has provision for adjusting the vertical discharge angle or trajectory. Thus vegetation can be deposited in an elongated mound, without moving the harvesting barge 10, by progressively swinging the thrower about its vertical pivotal axis and changing the trajectory. Alternatively, the mound of vegetation can be deposited on an adjacent transport barge 40. A centrifugal thrower 36 capable of discharging weeds horizontally 50 to 100 feet and vertically up to 70 feet will be adequate to deposit the vegetation at a convenient site. When harvesting under typical conditions with a harvesting barge having an 8 foot wide pickup conveyor 14, and with the barge moving at 2 miles per hour, a 16 hp motor on the thrower 36 can move onto shore 100 tons of vegetation per hour where the weight of vegetation is about 50 tons per acre.

The efficient material handling capability of the harvesting barge also makes it suitable for recovering material spread on an oil slick for the purpose of removing the oil from the water. Straw, plastic chunks and other materials which absorb the oil or to which the oil adheres can be collected and discharged to a disposal site.

Where the harvesting barge 10 is employed to harvest floating weeds in a channel or stream where the weeds are carried by a current, the barge can be anchored or moored as shown in FIG. 3. The floating vegetation can be funneled to the intake end of the harvesting barge by one or more booms. As shown in FIG. 3, a fixed boom 44 is employed together with a boom 46 which has one end pivotally anchored to the bed of the channel and the other end connected to a winch cable 48 which is connected to a shore located winch 50 and trained around a submerged pulley 51. The control provided for the boom 46 affords adjustment of the angle of feed toward the harvesting barge 10 to control the amount of vegetation flowing to the harvesting barge 10. The boom 46 also includes an endless chain 52 which travels in a horizontal plane in a slot 55 in the boom and carries spaced flights 54 which engage the floating material to prevent the weeds from bunching up or accumulating along the boom.

Various of the features of the invention are set forth in the following claims.

What is claimed is:

1. A method for harvesting flowing aquatic vegetation comprising the steps of consolidating said flowing vegetation in a concentration zone, intercepting and elevating the flowing vegetation, separating the vegetation from the water during elevation of the vegetation, compacting the vegetation into a projectible concentrate, and centrifugally accelerating the concentrate to a speed sufficient for air-borne discharge in a water spanning trajectory from the pick-up zone to a remote on-shore disposal site adjacent the shore which forms one of the boundaries of the concentrating zone to form a deposit of vegetation concentrate.

2. The method in accordance with claim 1 including the step of regulating the quantity of vegetation flowing from the concentration zone to the point of interception of the vegetation.

3. The method of claim 1 including the step of inducing the vegetation to flow from the concentration zone to the point of interception of the vegetation.

4. A method for harvesting aquatic vegetation comprising the steps of inducing relative movement between the vegetation and an intercept zone, intercepting and elevating the vegetation during the relative movement, separating the vegetation from the water during elevation of the vegetation, compacting the vegetation into a projectible concentrate, and centrifugally accelerating the concentrate to a speed sufficient for air-borne discharge in a water spanning trajectory from the pick-up zone to a remote disposal site to form a deposit of vegetation concentrate at the disposal site.

* * * * *